(12) United States Patent
Maligne et al.

(10) Patent No.: US 7,677,153 B2
(45) Date of Patent: Mar. 16, 2010

(54) BOOSTER AND BRAKE CONTROL DEVICE FITTED WITH THIS BOOSTER

(75) Inventors: Jean-Charles Maligne, Aubervilliers (FR); Ulysse Verbo, Sant-Cugat-Espagne (FR); Philippe Richard, Chelles (FR)

(73) Assignee: Robert Bosch GmbH (DE)

( * ) Notice: Subject to any disclaimer, the term of this patent is extended or adjusted under 35 U.S.C. 154(b) by 955 days.

(21) Appl. No.: 10/535,884

(22) PCT Filed: Nov. 14, 2003

(86) PCT No.: PCT/EP03/12750

§ 371 (c)(1),
(2), (4) Date: Apr. 11, 2006

(87) PCT Pub. No.: WO2004/048179

PCT Pub. Date: Jun. 10, 2004

(65) Prior Publication Data

US 2006/0162542 A1    Jul. 27, 2006

(30) Foreign Application Priority Data

Nov. 22, 2002  (FR) .................................. 02 14785

(51) Int. Cl.
*F15B 9/10* (2006.01)
(52) U.S. Cl. ..................................... 91/376 R
(58) Field of Classification Search ................. 91/369.2, 91/375 R
See application file for complete search history.

(56) References Cited

U.S. PATENT DOCUMENTS

| 6,065,388 A | 5/2000 | Tsubouchi et al. |
| 2002/0056362 A1 | 5/2002 | Inoue et al. |
| 2005/0023890 A1* | 2/2005 | Shinohara et al. ........ 303/113.3 |

FOREIGN PATENT DOCUMENTS

| EP | 0950595 | 10/1999 |
| EP | 1227020 | 5/2001 |
| WO | WO 2004048178 A1 * | 6/2004 |

* cited by examiner

*Primary Examiner*—F. Daniel Lopez
(74) *Attorney, Agent, or Firm*—Michael Best & Friedrich LLP (57) ABSTRACT

A device including a master cylinder driven by a control member, an enclosure for a pneumatic booster having a rear chamber separated from a front chamber by a piston, first and second balancing valve elements place the rear chamber in communication with the front chamber, first, second and third intake valve elements place the rear chamber in communication with a pneumatic pressure source, and a tubular support. The balancing valve elements are carried by a balancing part of the support and the pneumatic piston while the intake valve elements are carried by the first part of the control member, an intake part of the support and a second part of the control member. The first and second parts of the control member are connected through a spring arrangement for adjusting the relative axial position thereof as a function of the power of the force applied to the control member.

18 Claims, 7 Drawing Sheets

BOOSTER AND BRAKE CONTROL DEVICE FITTED WITH THIS BOOSTER

BACKGROUND OF THE INVENTION

A pneumatic brake booster, of the type comprising:

an axially movable control member for controlling this booster and intended to receive a control force applied by a user, a pneumatic enclosure containing two chambers, called a rear chamber and a front chamber, separated by a pneumatic piston, and means forming pneumatic valves comprising:

first and second complementary valve-forming elements for placing the rear chamber in communication with the front chamber, called first and second balancing valve elements, and first and second complementary valve-forming elements for placing the rear chamber in communication with a pneumatic pressure source, called first and second intake valve elements, is already known from the prior art.

The control member, also referred to as a plunger, is usually intended to transmit a braking force to a master cylinder control rod. The pneumatic piston is connected to the control rod.

A braking operation is controlled by the driver by means of a brake pedal connected to the braking device control member.

The pressure in the master cylinder changes as a function of the force exerted on the brake pedal, called braking force, in the following way.

Initially, the braking force is intended to overcome the preload on a return spring which returns the control member to a rest position. The booster remains at rest. The pressure in the master cylinder remains constant.

As the braking force increases, the preload on the control member return spring is overcome and the booster is activated. Now, with the booster in its rest configuration, there is usually an axial clearance between the control member and the control rod. Consequently, activating the booster causes a pressure jump in the master cylinder, this occurring with a constant braking force, since, on account of the axial clearance, the control member is not subjected to any reaction on the part of the master cylinder control rod.

It will therefore be appreciated that the greater the pressure jump in the master cylinder, the more rapidly effective the action on the brake pedal will be.

After canceling the axial clearance, the pressure in the master cylinder increases proportionally to the braking force, first of all at a ratio corresponding to the boost ratio of the booster, and then, after boost saturation, at a ratio which is less than the preceding one.

SUMMARY OF THE INVENTION

A particular object of the invention is to provide a pneumatic brake booster of the aforementioned type which, during its operation, brings about a pressure jump in the master cylinder which is more pronounced in the event of emergency braking than in the event of normal braking.

To this end, the subject of the invention is a pneumatic brake booster of the aforementioned type, characterized in that the control member comprises first and second parts which can move axially with respect to one another, the first part of the control member receiving the control force applied by the user by way of the second part of the control member, in that the valve-forming means comprise a tubular support mounted in an axially floating manner in the pneumatic enclosure, in that the first and second balancing valve elements are borne respectively by a balancing end of the support and the pneumatic piston, in that the first and second intake valve elements are borne respectively by the first part of the control member and an intake end of the support, in that the two parts of the control member are connected to one another by means for adjusting their relative axial position as a function of the power of the force applied to the control member, and in that a third intake valve element, complementary with the second intake valve element, is borne by the second part of the control member, the second intake valve element being intended to engage with the first or third intake valve element depending on the relative axial position of two parts of the control member.

According to features of various embodiments of this pneumatic brake booster:

the means for adjusting the relative axial position of the two parts of the control member comprise releasable locking means for locking the first part of the control member with the pneumatic piston which are activated when the distance between this first part of the control member and the pneumatic piston is reduced beyond a predetermined threshold, the pneumatic piston and the first part of the control member forming two mutually lockable members;

the locking means comprise:

elastic return means urging the pneumatic piston and the first part of the control member away from one another, called means for returning the first part of the control member, complementary axial bearing surfaces borne by one of the two lockable members and a free end of at least one arm secured axially to the other of the two lockable members, these axial bearing surfaces engaging with one another against the means for returning the first part of the control member, and means for releasing the complementary axial bearing surfaces engaging with the arm against an elastic force returning this arm into a position of engagement of the complementary bearing surfaces;

the means for adjusting the relative axial position of the two parts of the control member comprise at least one key mounted so that it can slide axially on the support, and, depending on the relative axial position of the key in the enclosure, the travel toward the rear of this key is limited:

either by a fixed rest stop, determining a rest position for the key, or, relative to the first part of the control member, by a rear stop formed on this first part of the control member;

the means for releasing the complementary axial bearing surfaces comprise a release cam formed on the key and intended to engage with a complementary part of the arm when this key bears on the fixed rest stop;

the travel of the second part of the control member is limited:

toward the rear and relative to the key, by a rear stop formed on this key, toward the front and relative to the first part of the control member, by a front stop formed on this first part of the control member;

the control member has a general shape of revolution of axis coinciding substantially with the axis of the support, the means for adjusting the relative axial position of the two parts of the control member comprising at least three keys and three arms distributed angularly about the axis of revolution of the control member;

the keys are connected to one another by a connecting sleeve mounted slideably on the support;

the booster comprises elastic return means urging each key and the support away from one another, in such a way in particular as to return the support toward the piston and thus connect this support elastically to movements of the piston;

each arm, which is preferably made of metal, is returned to a position of engagement of the complementary bearing surfaces by elastic deformation of this arm;

each arm is secured axially to the first part of the control member;

each arm is made in one piece with a metal annular support forming a front end of the first part of the control member;

the booster comprises elastic return means urging the second part of the control member and the pneumatic piston away from one another;

the booster comprises a feeler intended for the transmission of force between the control member and a master cylinder actuating rod, this feeler being inserted axially, on the one hand, between first and second bearing faces intended to be connected axially to the actuating rod, and, on the other hand, between the first bearing face intended to be connected to the actuating rod and a bearing face connected axially to the control member;

the first bearing face intended to be connected to the actuating rod delimits a reaction disk which is elastically deformable axially and intended to be connected axially to the actuating rod;

the second bearing face intended to be connected to the actuating rod delimits one end of a spacer sleeve borne by a member for axially guiding the control member, the bearing face connected axially to the control member delimiting a bearing ring housed within the bearing sleeve;

the pneumatic pressure source is atmospheric air.

Another subject of the invention is a brake control device, characterized in that it is driven by a booster as defined above.

A better understanding of the invention will be gained from reading the description which will follow, given solely by way of example and with reference to the drawings.

DETAILED DESCRIPTION OF THE INVENTION

FIGS. 1 to 6 represent a motor vehicle brake control device according to a first embodiment of the invention, denoted by the general reference 10.

In the text hereinbelow, an element of the kinematic chain connecting the driver to a brake of the vehicle will be called "rear element" when it is close to the driver in this kinematic chain and "front element" when it is close to the brake in this kinematic chain.

The brake control device 10 comprises a rod 12 for actuating a conventional master cylinder.

The brake control device 10 also comprises a pneumatic brake booster 14 which is intended to drive the master cylinder and is provided with an enclosure 16 having a general shape of revolution about an axis X. This axis X defines an axial direction.

The enclosure 16, which is generally housed in the engine compartment of the motor vehicle, is inserted axially between the master cylinder and a control rod 18 connected to a conventional brake control pedal (not shown). The control rod 18 is connected axially to a plunger 20 forming a moving control member intended to receive the control force applied to the brake pedal by the user.

The plunger 20, having a general shape of revolution, comprises first 20A and second 20B parts which are substantially coaxial and can move axially with respect to one another so as to allow the length of this plunger 20 to be adjusted. The control rod 18 is connected axially to the second part 20B of the plunger 20. The first part 20A of the plunger therefore receives the control force applied by the user by way of the second part 20B of the plunger.

The first part 20A of the plunger is, for example, slideably mounted on the second part 20B of the plunger so as to be guided axially by this second part. An O-ring seal 20J is inserted radially between the two parts 20A, 20B of the plunger.

In the conventional way, the enclosure 16 comprises a first chamber, called rear chamber CA, which can be connected, via means housed in a rear tubular continuation 21 of the enclosure 16, to a pneumatic pressure source, for example atmospheric air as in the embodiment illustrated.

The enclosure 16 also comprises a second chamber, called front chamber CB, separated from the rear chamber CA by a moving assembly comprising a pneumatic piston 22 connected to a rigid skirt 24 and a flexible diaphragm 26. The front chamber CB can be connected to a vacuum source using conventional connection means. The moving assembly will be referred to hereinafter as piston assembly 22.

The piston assembly 22 is able to move in a substantially axial direction as a function of the pressure variations in at least one of the two chambers CA, CB. This pressure variation is what generates the boost force of the booster 14.

The piston assembly 22 is secured axially to the master cylinder actuating rod 12.

Figure 1:
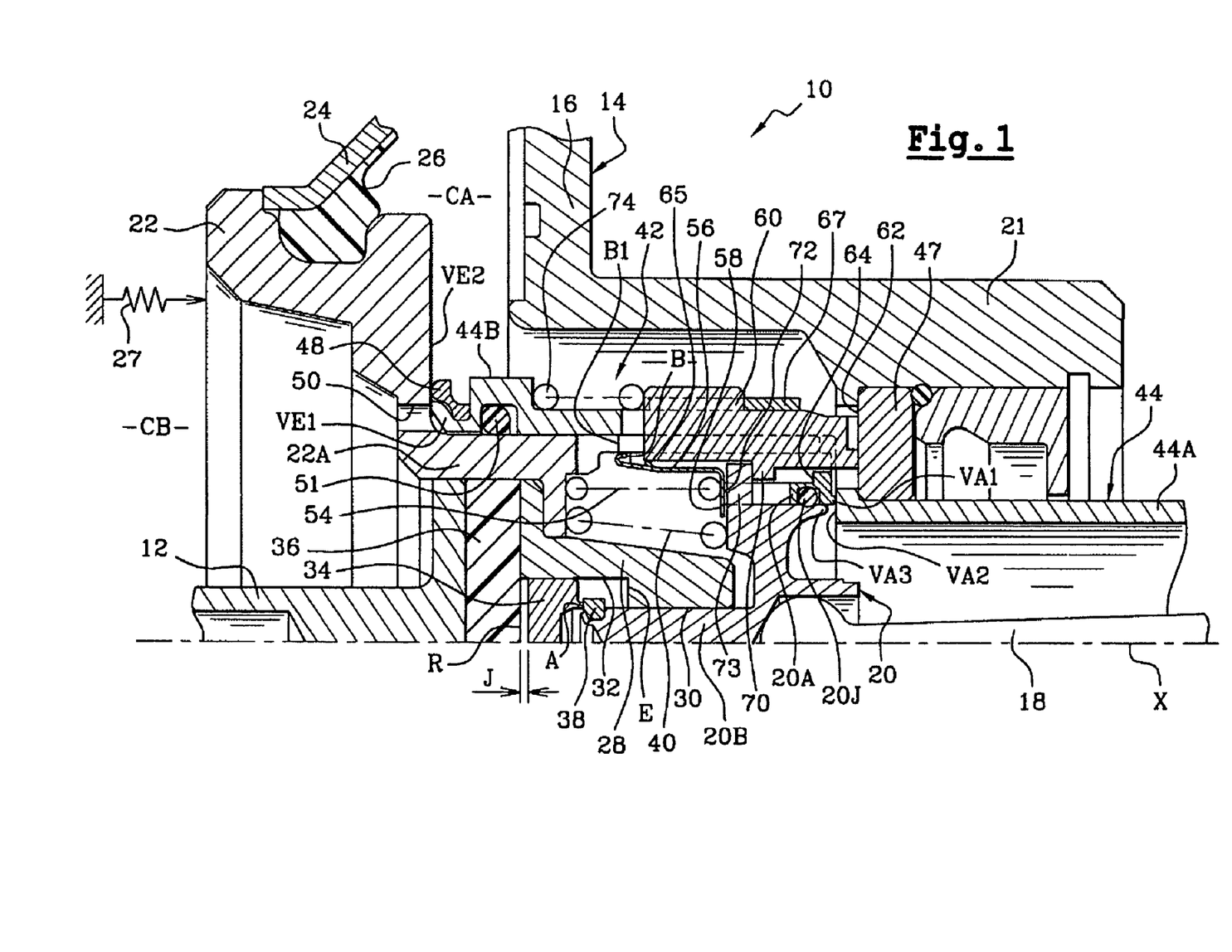
FIG. 1 is a view in axial section of a brake control device according to a first embodiment of the invention, this device being in a rest configuration.

The piston assembly 22 is returned elastically toward a rest position, as represented in. FIG. 1, corresponding to a minimum volume of the rear chamber CA, using conventional means 27 schematically illustrated in FIG. 1.

The second part 20B of the plunger is guided axially by means of a member 28 secured axially to the master cylinder actuating rod 12 and to the piston assembly 22. The guide member 28, which is generally annular in shape, has an internal supporting surface 30 engaging with the contour of the second part 20B of the plunger so as to guide it axially, and a recess 32 forming an internal cavity within the guide member 28.

A feeler 34, intended for the transmission of force between the plunger 20 and the actuating rod 12, is housed in the recess 32. This feeler 34, which can move axially in the recess 32, is inserted axially between a bearing face R, delimiting a reaction disk 36, and a shoulder E which separates the supporting surface 30 from the recess 32.

The reaction disk 36, which is elastically deformable axially, is inserted axially between the master cylinder actuating rod 12 and the guide member 28. The reaction disk 36 and its bearing face R are connected axially to the rod 12 and to the piston assembly 22.

The feeler 34 is also inserted axially between the bearing face R delimiting the reaction disk and a bearing face A delimiting a ring 38 connected axially to the second part 20B of the plunger. The bearing ring 38, fitted onto the second part 20B of the plunger, is secured axially to this second part 20B of the plunger.

FIG. 1 represents the control device 10, particularly the booster 14, in a rest configuration. It will be noted that in this rest configuration there is an axial clearance J between the second part 20B of the plunger and the reaction disk 36. More specifically, since the feeler 34 bears against the ring 38, the clearance J extends axially between the feeler 34 and the reaction disk 36. The ring 38 is fitted onto the plunger 20. Precise adjustment of the clearance J may be achieved for example by swaging the end of the feeler 34.

When the brake pedal is suddenly released by the user, the ring 38 forms an axial stop engaging with the shoulder E of the guide member 28 so as to prevent the plunger 20 and the pneumatic piston 22 from separating.

A spring 40 working in compression bears, on the one hand, on a seat integral with the pneumatic piston 22 and, on the other hand, on a seat integral with the second part 20B of the plunger. This spring 40 forms elastic return means urging the second part 20B of the plunger and the pneumatic piston 22 away from one another, in such a way in particular as to return the plunger 20 toward a rest position as represented in FIG. 1.

According to a conventional operation of the booster 14, the rear chamber CA can be placed in selective communication with, on the one hand, the front chamber CB and, on the other hand, the pneumatic pressure source with the aid of means 42 forming pneumatic valves.

Figure 2:
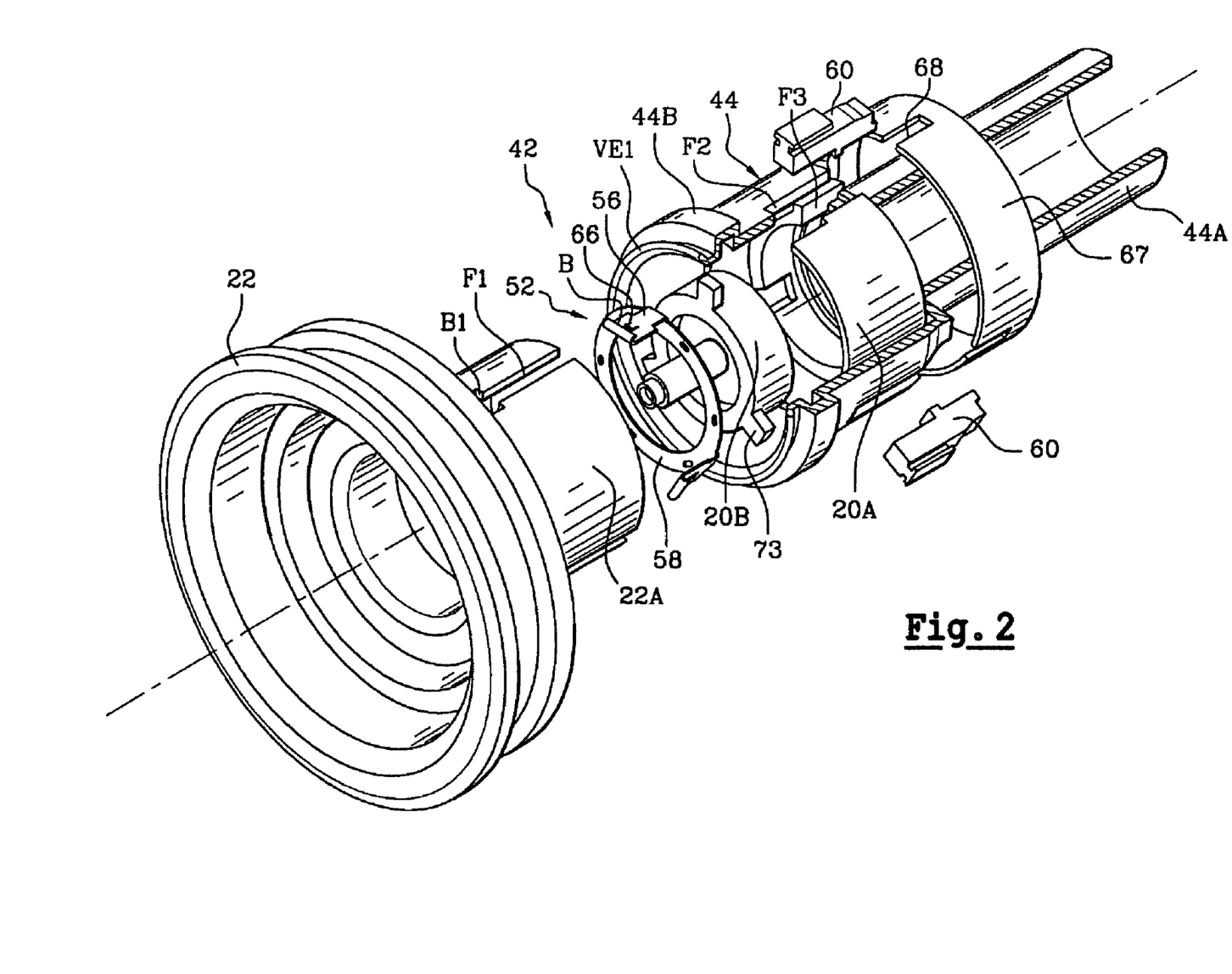
FIG. 2 is a perspective view, partly in section, of the tubular support for the valve-forming means and of certain elements adjacent to this support.
Figure 3:
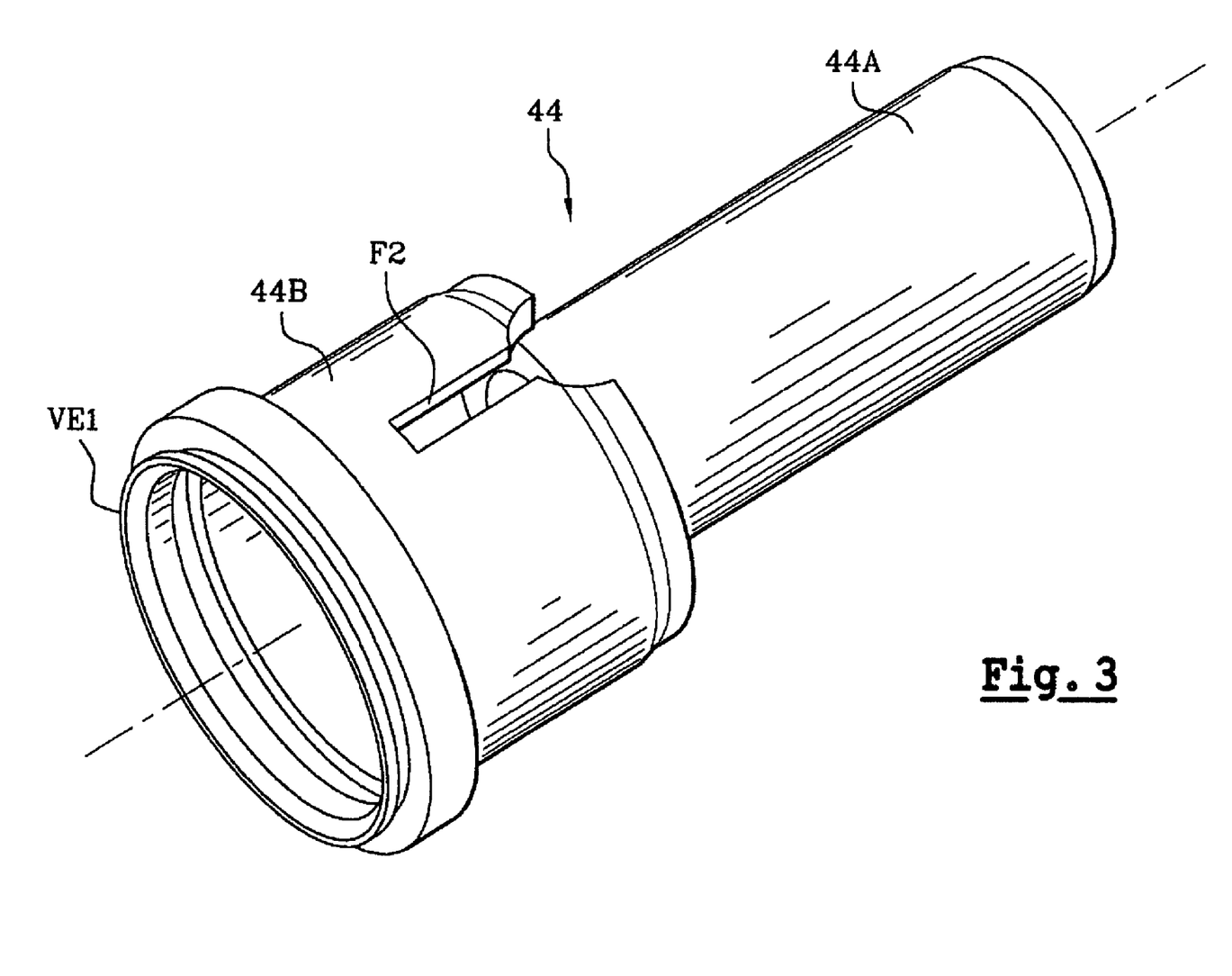
FIG. 3 is a perspective view of the tubular support in isolation.

With reference to FIGS. 1 and 2, it can be seen that the valve-forming means 42 comprise a tubular support 44 mounted in an axially floating manner in the rear continuation 21 of the enclosure 16. It will be noted that the axis X forms an axis of revolution of the support 44 coinciding substantially with the axis of revolution of the plunger 20. FIG. 3 represents the support 44 in isolation from the rest of the control device 10.

The valve-forming means 42 also comprise first VA1, second VA2 and third VA3 complementary elements forming a valve for placing the rear chamber CA in communication with the pneumatic pressure source. These elements are referred to as first VA1, second VA2 and third VA3 intake valve elements.

The first intake valve element VA1, complementary with the second element VA2, is borne by the first part 20A of the plunger. The second intake valve element VA2 is borne by a rear end 44A of the support, called intake end 44A. The third intake valve element VA3, complementary with the second element VA2, is borne by the second part 20B of the plunger.

The second intake valve element VA2 is intended to engage with the first VA1 or third VA3 intake valve element depending on the relative axial position of two parts 20A, 20B of the plunger.

It will be noted that the intake end 44A of the support, this end being housed in the rear continuation 21 of the enclosure 16, forms a duct connecting the rear chamber CA to the pressure source, this being the case when the intake valve formed by the elements VA1, VA2, VA3 is open.

Conventional sealing and axial guide means 47, which are generally annular in shape, are inserted radially between the internal contour of the continuation 21 of the enclosure 16 and the external contour of the intake part 44A of the support.

The valve-forming means 42 also comprise first VE1 and second VE2 complementary elements forming a valve for placing the rear chamber CA in communication with the front chamber CB. These elements are referred to as first VE1 and second VE2 balancing valve elements.

The first balancing valve element VE1 is borne by a front end 44B of the support, called balancing end 44B. The second balancing valve element VE2 is borne by the pneumatic piston 22.

In the example illustrated, the first balancing valve element VE1 bears an annular seal 48 intended to engage with the second balancing valve element VE2, forming a bearing seat for the seal 48.

The second balancing valve element VE2 is provided with a port 50 intended to place the front CA and rear CB chambers in communication with one another. The port 50 can be closed off by the first balancing valve element VE1.

As a variant, the arrangement of the seal 48 and of the seat on the balancing valve elements could be reversed.

The piston 22 comprises a rear annular continuation 22A forming axial guide means for the balancing end 44B of the support. This end 44B is in fact fitted around the continuation 22A. An O-ring seal 51 is inserted radially between the continuation 22A and the balancing end 44B.

The two parts 20A, 20B of the plunger are connected to one another by means 52 for adjusting their relative axial position as a function of the power of the force applied by the user to the second part 20B of the plunger 20.

These adjustment means 52 comprise releasable locking means for locking the first part 20A of the plunger with the pneumatic piston 22 which are activated when the distance between this first part 20A of the plunger and the pneumatic piston 22 is reduced beyond a predetermined threshold.

In the text hereinbelow, the first part 20A of the plunger and the pneumatic piston 22 will be designated as being two mutually lockable members.

The locking means comprise a spring 54, working in compression, bearing, on the one hand, on a seat integral with the first part 20A of the support and, on the other hand, on a seat integral with the pneumatic piston 22. This spring 54 forms elastic return means urging the first part 20A of the plunger and the pneumatic piston 22 away from one another. The spring 54 will be referred to subsequently as spring for returning the first part 20A of the plunger.

The locking means comprise at least one arm 56, for example three arms 56 distributed angularly about the axis X. Each arm 56 is secured axially to one of the two lockable members, for example the first part 20A of the plunger as is represented in the figures.

Thus, in the example illustrated in the figures, each arm 56, which is preferably made of metal, comprises a free end in the form of a hook and an end made in one piece with a metal annular support 58 forming a front end of the first part 20A of the plunger. The annular support 58 is fastened to the remainder of the first part 20A, which is preferably made of plastic, by melting plastic studs housed in complementary orifices of the support 58.

The free end of the arms 56 forms an axial bearing surface B intended to engage with a complementary axial bearing surface B1 borne by the other of the two lockable members, namely the piston 22 as is represented in the figures. Specifically, it can be seen particularly from FIGS. 1 and 2 that the bearing surface B1 is made in the continuation 22A of the piston 22.

The bearing surfaces B, B1 constitute complementary axial bearing surfaces intended to engage with one another against the return force of the spring 54. Each arm 56 is returned to a position of engagement of the complementary bearing surfaces B, B1 by elastic deformation of this arm 56.

The adjustment means 52 additionally comprise a key 60 associated with each arm 56. The three keys 60, distributed angularly about the axis X, are mounted so that they can slide axially on the support 44.

Since the three keys 60 are identical, only one of them will be described below.

Depending on the relative axial position of the key 60 in the enclosure 16, the travel of this key 60 toward the rear is limited:

either by a fixed rest stop 62 secured axially to the rear continuation 21 of the enclosure, or, relative to the first part 20A of the plunger, by a rear stop 64 formed on this first part 20A of the plunger.

The fixed rest stop 62 determines a rest position for the key 60.

The key 60 is intended to engage with a corresponding arm 56 so as to release the complementary axial bearing surfaces B, B1 while opposing the elastic return force returning the arm 56 to a position of engagement of these bearing surfaces B, B1.

To this end, a release cam 65 is formed on the key 60. The release cam 65 is intended to engage with a complementary part of the arm 56, for example a tab 66 formed by a cut made in this arm, when this key 60 bears on the fixed rest stop 62 (see in particular FIGS. 1, 2 and 4).

The three keys 60 are connected to one another, for example by a connecting sleeve 67 mounted slideably on the support 44.

Each key 60 is fastened to the sleeve 67 for example by being fitted into an axial notch 68 in this sleeve 67 (see in particular FIG. 2).

The travel of the second part 20B of the plunger is limited:

toward the rear and relative to each key 60, by a rear stop 70 formed on each wedge 60, and toward the front and relative to the first part 20A of the plunger, by a front stop 72 formed on this first part 20A of the plunger. The front stop 72 is formed, for example, by a face of the annular support 58.

It will be noted that the rear 70 and front 72 stops are intended to engage with the radial fingers 73 of the second part 20B of the plunger (see in particular FIGS. 1 and 2).

A spring 74, working in compression, bears, on the one hand, on a seat integral with the balancing end 44B of the support and, on the other hand, on a seat formed on each key 60. This spring 74 forms elastic return means urging the support 44 and each key 60 away from one another, in such a way in particular as to return the support 44 toward the piston 22 and thus connect this support 44 elastically to movements of the piston 22.

It will be noted that axial slots F1, F2, F3 made respectively in the rear continuation 22A of the piston, the balancing end 44B of the support and the first part 20A of the plunger participate in axially guiding the keys 60 and the radial fingers 73 of the second part 20B of the plunger. The axial bearing surfaces B1 are delimited by shoulders of the slots F1 made in the continuation 22A of the piston. Each bearing surface B1 separates two parts, a narrow part and a wide part respectively, of the corresponding slot F1. The narrow part of the slot F1 retains the free end (bearing surface B) of the corresponding arm 56 radially separated from the bearing surface B1. The wide part of the slot F1 allows the free end of the arm 56 (bearing surface B) to be positioned at the same level radially as the bearing surface B1.

The main aspects of the operation of the brake control device 10 which are connected with the invention will be stated below.

At rest, the brake control device 10 is in the configuration represented in FIG. 1. The second part 20B of the plunger bears against a rear wall of the enclosure 16 by way of the keys 60. Specifically, the second part 20B of the plunger bears against the rear stop 70 of each key 60, the latter bearing against the fixed rest stop 62. The means 27 for returning the piston assembly 22 into its rest position urge the piston 22 to bear against the support 44, the latter engaging, like each key 60, with the fixed rest stop 62. The first VE1 and second VE2 balancing valve elements engage with one another. This balancing valve is therefore closed.

The spring 54 urges the first part 20A of the plunger in such a way that the first VA1 and second VA2 intake valve elements engage with one another. This intake valve is therefore closed.

The third intake valve element VA3 is kept separated from the second intake valve element VA2 by engagement of the second part 20B of the plunger with the keys 60.

It will be noted that an axial clearance is present between the second part 20B of the plunger and the front stop 72 of the first part 20A of this plunger so as to avoid a hyperstatic positioning of the support 44.

The free ends of the arms 56, more particularly the bearing surfaces B of these arms, are kept separated from the bearing surfaces B1 by engagement of the release cam 65 of each key 60 with the tab 66 of the corresponding arm 56.

Figure 4:
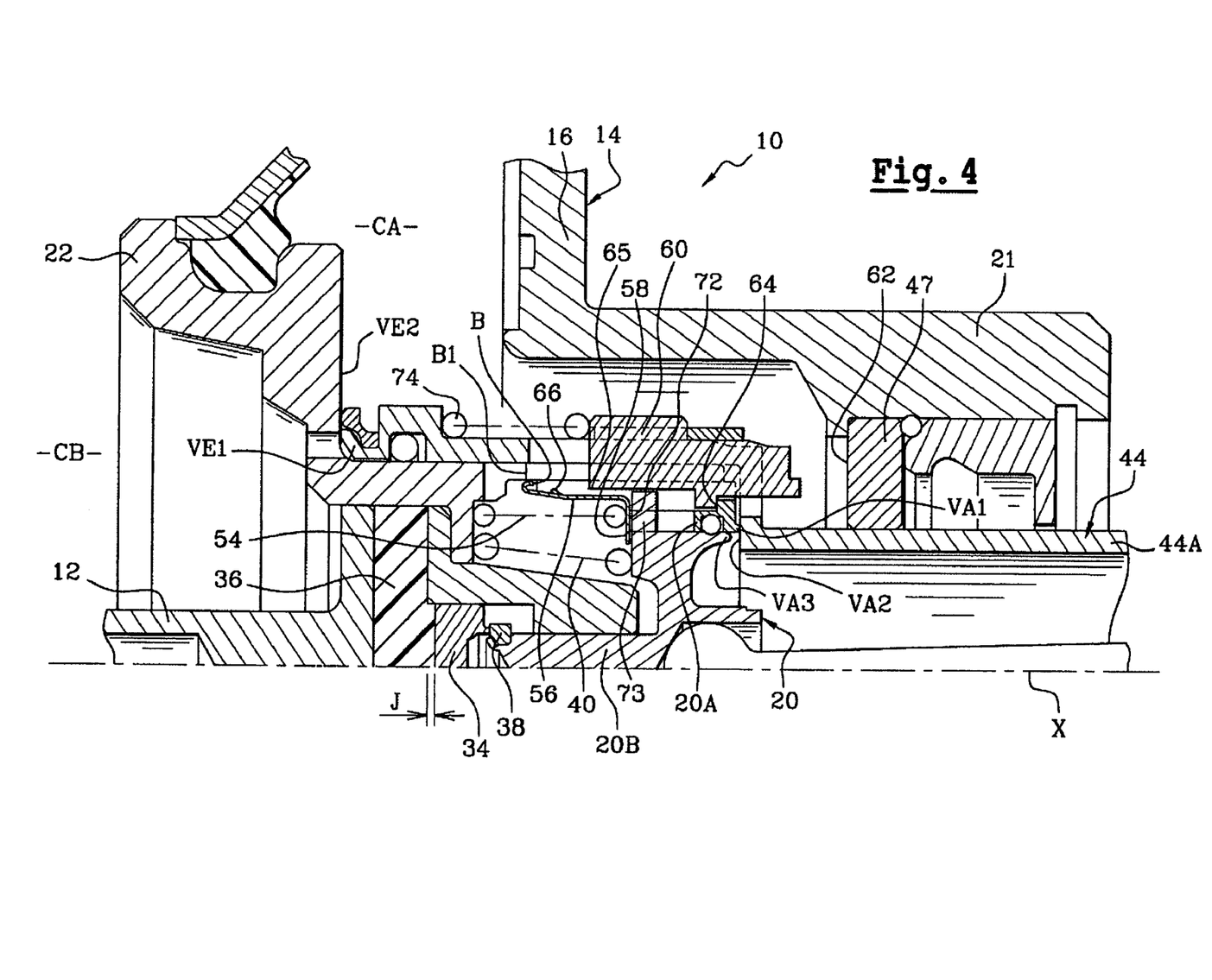
FIGS. 4 and 5 are views which are similar to that of FIG. 1, showing the brake control device in a normal braking configuration and an emergency braking configuration, respectively.

FIG. 4 represents the control device 10 in a configuration such that the plunger 20 is in equilibrium during a normal braking operation.

By comparison with the configuration of FIG. 1, the support 44, together with the piston assembly 22, has moved forward. The spring 74 urges each key 60 to bear against the rear stop 64 of the first part 20A of the plunger. The second part 20B of the plunger bears against the front stop 72 of the first part 20A of the plunger.

The relative position of the three intake valve elements VA1, VA2, VA3 is not modified with respect to the configuration represented in FIG. 1. Likewise, the relative position of the balancing valve elements VE1, VE2 is not modified with respect to the configuration represented in FIG. 1.

Since the braking operation proceeds under normal conditions, the distance between the first part 20A of the plunger and the piston assembly 22 is not reduced during braking beyond the predetermined threshold, with the result that there is no locking of the bearing surfaces B of the arms 56 with the bearing surfaces B1 of the piston assembly 22.

The relative position of the two parts 20A, 20B of the plunger corresponds to an axial clearance J which is capable of causing a normal pressure jump in the master cylinder when the user interrupts the equilibrium of the plunger 20 by increasing the power of the force applied to the brake pedal.

Figure 5:
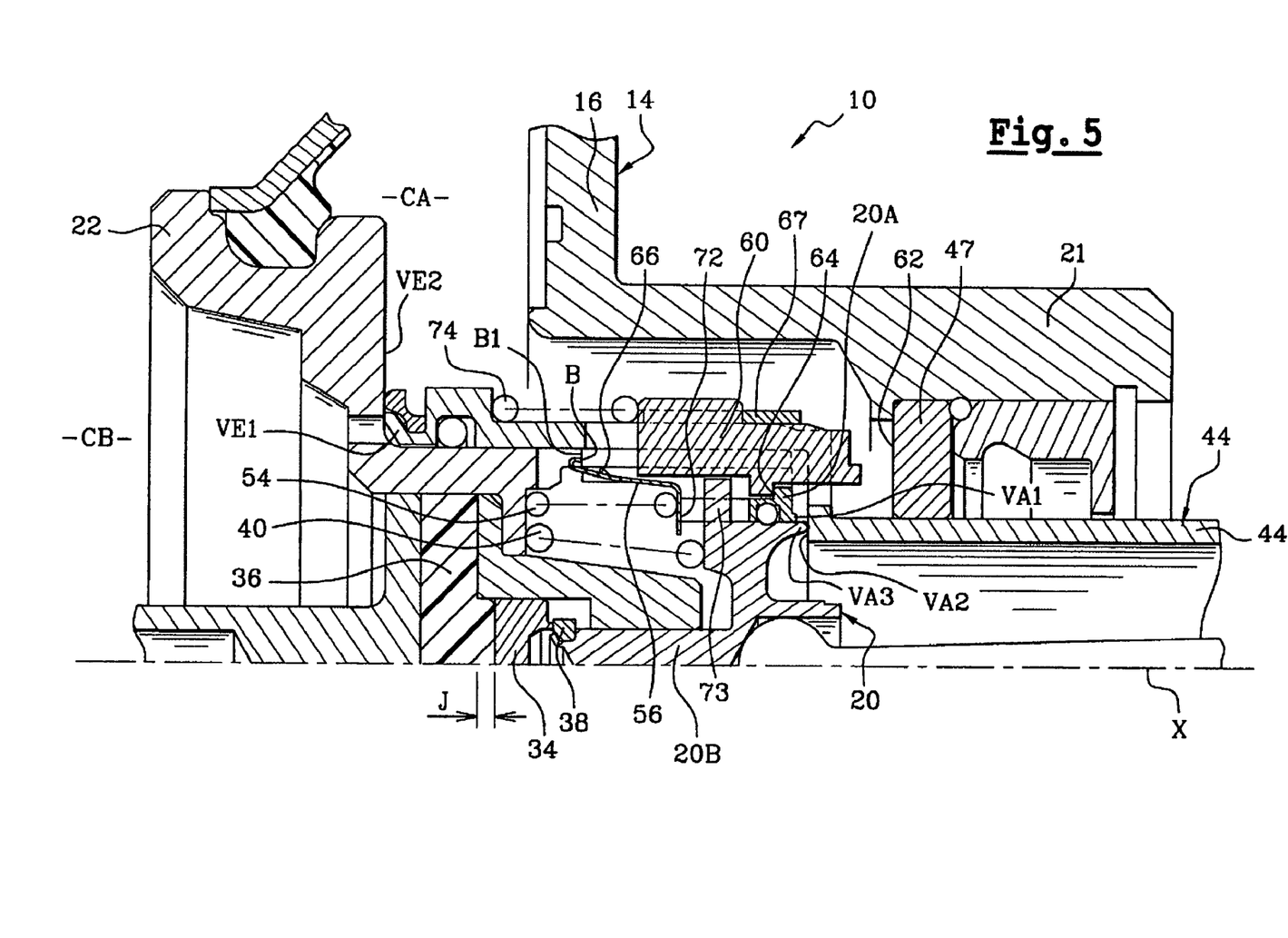

FIG. 5 represents the control device 10 in a configuration such that the plunger 20 is in a position of equilibrium during an emergency braking operation.

On account of the inertia of the piston assembly 22, the emergency braking (considerable force applied to the brake pedal) causes a relative coming together of the first part 20A of the plunger and the piston assembly 22 which is substantial enough for the distance between this first part 20A of the plunger and the piston assembly 22 to be reduced beyond the predetermined threshold. This causes the automatic return of the bearing surfaces B borne by the arms 56 at the same radial level as the bearing surfaces B1 borne by the rear continuation 22A of the piston. Hence, with the plunger 20 in the equilibrium configuration represented in FIG. 5, the bearing surfaces B engage, against the return force of the spring 74, with the bearing surfaces B1 so as to keep the first VA1 and second VA2 intake valve elements separated from one another.

The third intake valve element VA3 then engages with the second intake valve element VA2 so as to close this intake valve. This relative position of the second VA2 and third VA3 intake valve elements imposes an axial clearance J which is greater than the clearance obtained under the normal braking conditions described above. When the user interrupts the equilibrium of the plunger 20 by increasing the power of the force applied to the brake pedal, this greater clearance J makes it possible to obtain a pressure jump in the master cylinder which is greater than that described above in the case of normal braking.

Figure 6:
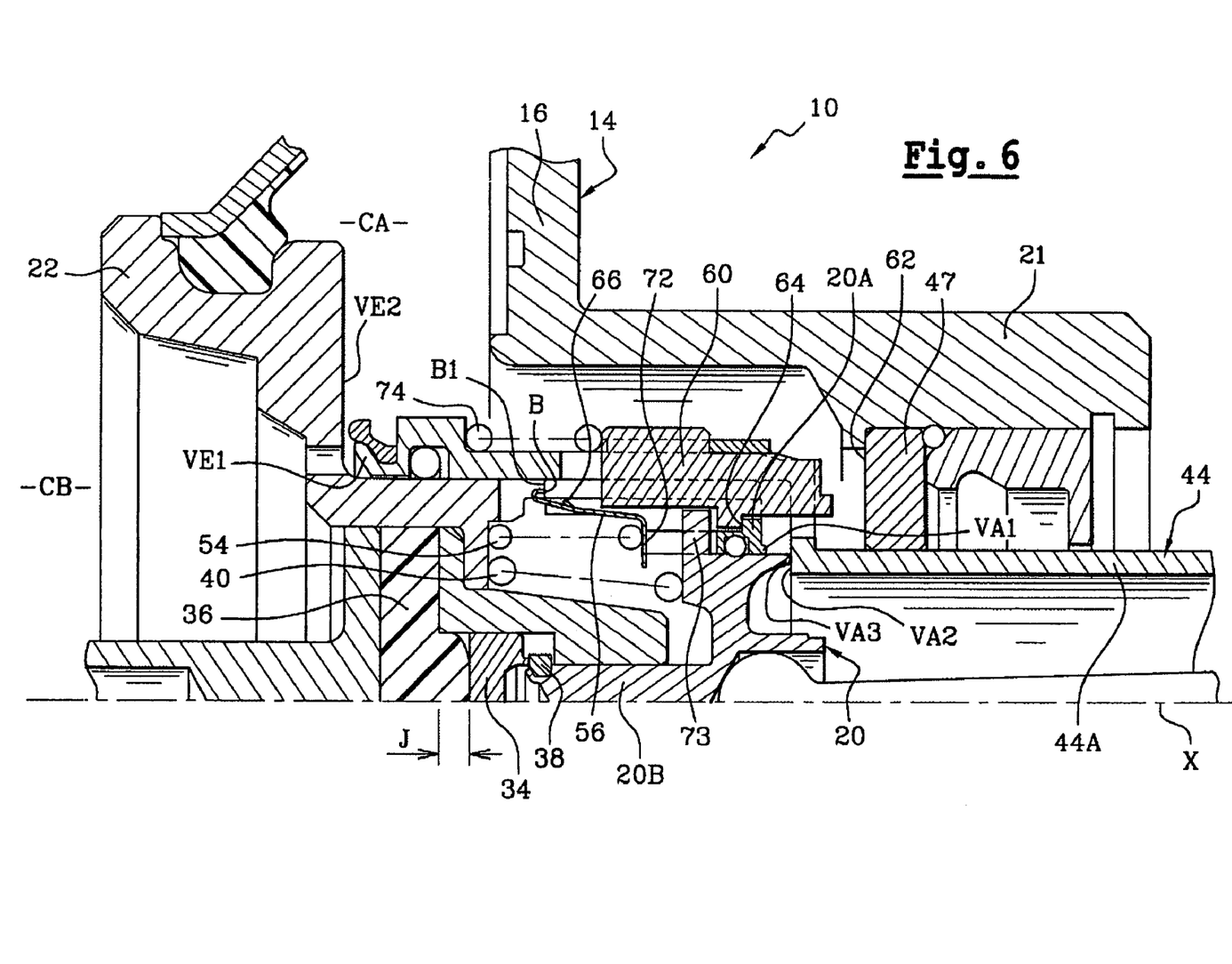
FIG. 6 is a view similar to that of FIG. 1, showing the brake control device in a configuration in which braking is interrupted.

FIG. 6 represents the control device 10 in a configuration corresponding to an interruption of the braking operation (the user releases the brake pedal).

By comparison with the configuration represented in FIG. 5, the support 44 moves toward the rear so as to open the balancing valve (the balancing valve elements VE1, VE2 move away from one another). The chambers CA, CB communicate with one another. The first intake valve element VA1 is still kept separated from the second intake valve element VA2 by the engagement of the axial bearing surfaces B, B1. The third intake valve element VA3 still engages with the second intake vale element VA2.

As it continues its movement toward the rear, the support 44 reaches the rest position represented in FIG. 1, in which each key 60 bears against the rest stop 62. In this position, the cams 65 of the keys 60 engage with the arms 56 so as to release the axial bearing surfaces B, B1.

Figure 7:
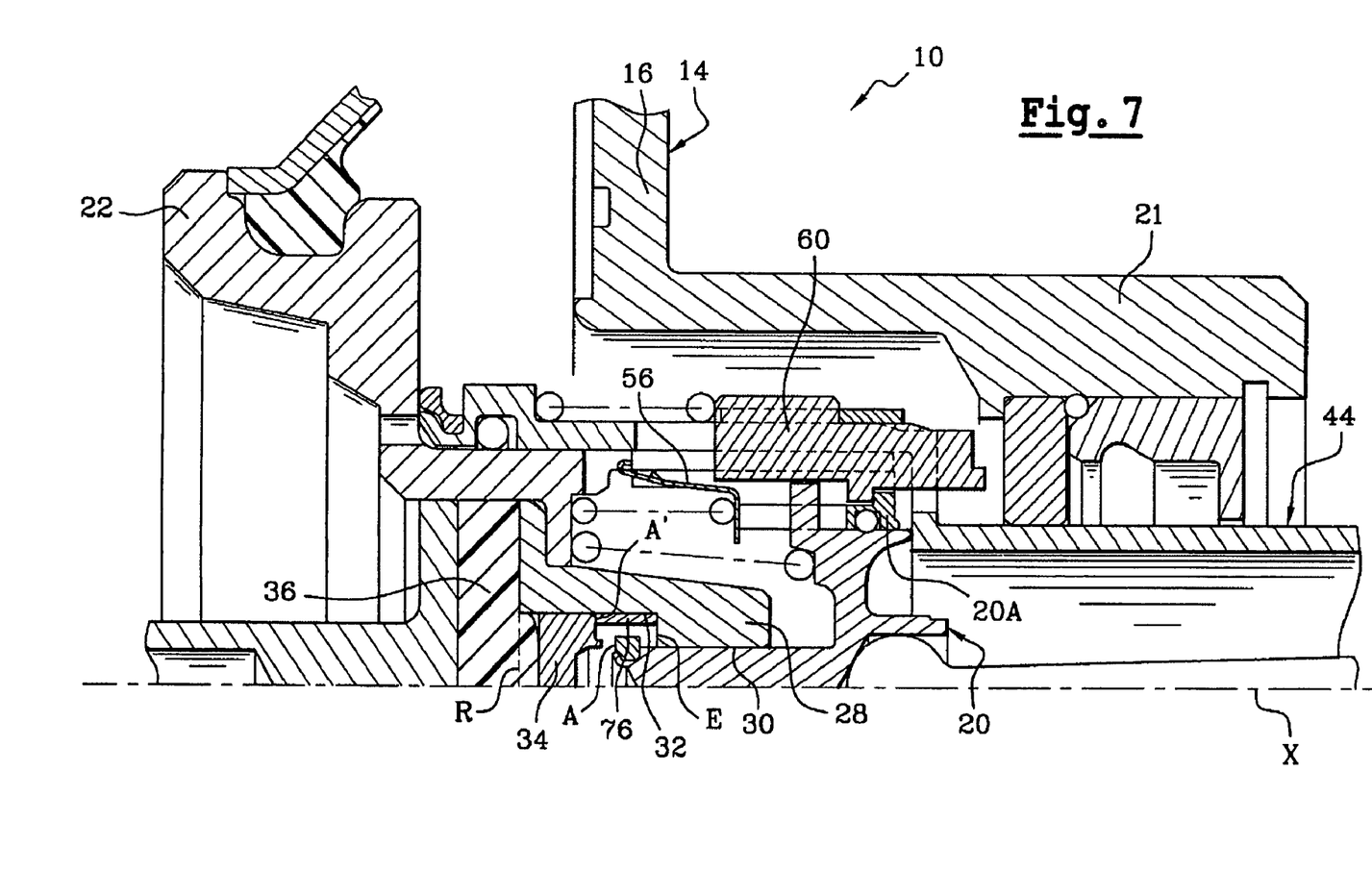
FIG. 7 is a view similar to that of FIG. 5 of a brake control device according to a second embodiment of the invention.

FIG. 7 represents a brake control device 10 according to a second embodiment of the invention. In this figure, those elements which are analogous to those in the preceding figures are denoted by identical references.

In this case, the feeler 34 is inserted axially between the bearing face R delimiting the reaction disk 36 and a bearing face A' delimiting one end of a spacer sleeve 76 housed in the recess 32. The spacer sleeve 76 is inserted axially between the feeler 34 and the shoulder E separating the supporting surface 30 from the recess 32. It will be noted that the ring 38 is housed within the sleeve 76.

The spacer sleeve 76 makes it possible in certain cases, when this sleeve 76 is connected axially to the actuating rod 12, to return the reaction to which the actuating rod 12 has been subjected toward the piston assembly 22 instead of toward the plunger 20. This is because the feeler 34 bears on this spacer sleeve 76 instead of on the bearing ring 38 in certain operational configurations of the control device 10.

The operation of the control device 10 according to the second embodiment of the invention is analogous, mutatis mutandis, to the operation of the device 10 according to the first embodiment of the invention.

Among the advantages of the invention, it will be noted that this invention makes it possible, by virtue of the automatic adjustment of the relative axial position of the two parts 20A, 20B of the plunger 20, to bring about a pressure jump in the master cylinder which is more pronounced in the event of emergency braking than in the event of normal braking.

What is claimed is:

1. A pneumatic brake booster (14) comprising:
an axially movable control member (20) for controlling the booster and for receiving a control force applied by a user;
a pneumatic enclosure (16) containing a rear chamber (CA) and a front chamber (CB), separated by a pneumatic piston (22); and
means (42) for forming pneumatic valves comprising:
a first balancing valve element (VE1) and a second balancing valve element (VE2) for placing the rear chamber (CA) in communication with the front chamber (CB) and
a first intake valve element (VA1) and a second intake valve element (VA2) for placing the rear chamber (CA) in communication with a pneumatic pressure source, characterized:
in that the control member (20) has a first part (20A) that axially moves with respect to a second part (20B), said first part (20A) of the control member (20) receiving the control force applied by the user by way of the second part (20B) of the control member (20);
in that the means (42) for forming the valve comprise a tubular support (44) that is mounted in an axially floating manner in the pneumatic enclosure (16);
in that said first balancing valve element (VE1) and said second balancing valve element (VE2) are borne respectively by a balancing end (44B) of the support and the pneumatic piston (22); in that said first intake valve element (VA1) and said second intake valve element (VA2) are borne respectively by the first part (20A) of the control member (20) and an intake end (44A) of said tubular support (44);
in that said first part (20A) and said second part (20B) of the control member (20) are connected by means (52) for adjusting their relative axial position as a function of the power of the force applied to the control member (20); and
in that a third intake valve element (VA3), complementary with said second intake valve element (VA2) is borne by the second part (20B) of the control member (20), said second intake valve element (VA2) selectively engaging with one of said first intake valve element (VA1) or said third (VA3) intake valve element depending on the relative axial position of said first and second parts of the control member (20).

2. The booster according to claim 1, characterized in that the means (52) for adjusting the relative axial position of the said first and second parts (20A, 20B) of the control member (20) comprise releasable locking means for locking the first part (20A) of the control member (20) with the pneumatic piston (22) which are activated when the distance between this first part (20A) of the control member (20) and the pneumatic piston (22) is reduced beyond a predetermined threshold, said pneumatic piston (22) and said first part (20A) of the control member (20) forming two mutually lockable members.

3. The booster according to claim 2, characterized in that the locking means comprise:
an elastic return means (54) for urging the pneumatic piston (22) and said first part (20A) of the control member (20) away from one another and for returning the first part (20A) of the control member (20);

complementary axial bearing surfaces (B, B1) borne by said pneumatic piston of said two lockable members and a free end of at least one arm (56) secured axially to said first part (20A) of the two lockable members, said axial bearing surfaces (B, B1) engaging with one another against the means (54) for returning the first part (20A) of the control member (20), and means (65) for releasing the complementary axial bearing surfaces (B, B1) engaging with said arm (56) against an elastic force returning said arm (56) into a position of engagement of said complementary bearing surfaces (B, B1).

4. The booster according to claim 3, characterized in that the means (52) for adjusting the relative axial position of said first and second parts (20A, 20B) of the control member (20) comprise at least one key (60) mounted to slide axially on the support (44), and in that, depending on the relative axial position of the key (60) in the enclosure, the travel toward the rear of said key (60) is limited:

either by a fixed rest stop (62), determining a rest position for the key (60), or, relative to the first part (20A) of the control member (20), by a rear stop (64) formed on this first part (20A) of the control member (20).

5. The booster according to claim 4, characterized in that the means for releasing the complementary axial bearing surfaces comprise a release cam (65) formed on the key (60) and engaged with a complementary part (66) of the arm when said key (60) bears on the fixed rest stop (62).

6. The booster according to claim 5, characterized in that the travel of the second part (20B) of the control member (20) is limited:

toward the rear and relative to the key (60), by a rear stop (70) formed on said key (60); and toward the front and relative to the first part (20A) of the control member (20), by a front stop (72) formed on said first part (20A) of the control member (20).

7. The booster according to claim 6, characterized in that the control member (20) has a general shape of revolution of axis (X) coinciding substantially with the axis of the tubular support (44), the means (52) for adjusting the relative axial position of said first and second parts (20A, 20B) of the control member (20) comprising at least three keys (60) and three arms (56) distributed angularly about the axis of revolution (X) of the control member (20).

8. The booster according to claim 7, characterized in that the keys (60) are connected to one another by a connecting sleeve (67) mounted slideably on the tubular support (44).

9. The booster according to claim 8, further characterized by elastic return means (74) for urging each key (60) and the tubular support (44) away from one another to return the tubular support (44) toward the piston (22) and thus connect this tubular support (44) elastically to movements of the piston (22).

10. The booster according to claim 9, characterized in that each arm (56) which is is returned to a position of engagement of the complementary bearing surfaces (B, B1) by elastic deformation of this arm (56).

11. The booster according to claim 10, characterized in that each arm (56) is secured axially to the first part (20A) of the control member (20).

12. The booster according to claim 11, characterized in that each arm (56) is made in one piece with a metal annular support (58) forming a front end of the first part (20A) of the control member (20).

13. The booster according to claim 12, further characterized by said elastic return means (40) urging said second part (20B) of the control member (20) and said pneumatic piston (22) away from one another.

14. The booster according to claim 13, further characterized by a feeler (34) for the transmission of force between the control member (20) and a master cylinder actuating rod (12), this feeler (34) being inserted axially, on the one hand, between first (R) and second (A') bearing faces connected axially to the actuating rod (12), and between the first bearing face (R) connected to the actuating rod (12) and a bearing face (A) connected axially to the control member (20).

15. The booster according to claim 14, characterized in that the first bearing face (R) connected to the actuating rod (12) delimits a reaction disk (36) which is elastically deformable axially and connected axially to the actuating rod (12).

16. The booster according to claim 15, characterized in that said second bearing face (A') is connected to the actuating rod (12) delimits one end of a spacer sleeve (66) borne by a member (28) for axially guiding the control member (20) while said bearing face (A) is connected axially to the control member (20) delimiting a bearing ring (38) housed within the bearing sleeve (66).

17. The booster according to claim 16, characterized in that the pneumatic pressure source is atmospheric air.

18. The booster according to claim 10, wherein each arm is made of metal.

* * * * *